United States Patent
Barker (10) Patent No.: US 10,798,044 B1
(45) Date of Patent: *Oct. 6, 2020

(54) METHOD FOR ENHANCING TEXT MESSAGES WITH PRE-RECORDED AUDIO CLIPS

(71) Applicant: NUFBEE LLC, Westborough, MA (US)

(72) Inventor: Bruce James Barker, Franklin, MA (US)

(73) Assignee: NUFBEE LLC, Westborough, MA (US)

( * ) Notice: Subject to any disclaimer, the term of this patent is extended or adjusted under 35 U.S.C. 154(b) by 199 days.

This patent is subject to a terminal disclaimer.

(21) Appl. No.: 16/113,715

(22) Filed: Aug. 27, 2018

Related U.S. Application Data (63) Continuation-in-part of application No. 15/678,525, filed on Aug. 16, 2017, now abandoned, which is a
(Continued)

(51) Int. Cl.
| | | |
|---|---|---|
| H04L 12/58 | (2006.01) | |
| G06F 3/16 | (2006.01) | |
| G06F 3/0482 | (2013.01) | |

(52) U.S. Cl.
CPC ............ *H04L 51/32* (2013.01); *G06F 3/0482* (2013.01); *G06F 3/16* (2013.01); *H04L 51/08* (2013.01)

(58) Field of Classification Search
CPC ............ H04M 1/72558; H04M 1/656; H04M 1/7255; H04M 3/533; H04N 21/4788;
(Continued)

(56) References Cited

U.S. PATENT DOCUMENTS

| | | |
|---|---|---|
| 5,793,980 A | 8/1998 | Glaser et al. |
| 6,816,578 B1 | 11/2004 | Kredo et al. |

(Continued)

OTHER PUBLICATIONS

The enclosed PTO form 892 was filed by the examiner in parent U.S. Appl. No. 15/594,330, filed May 12, 2017, citing the above identified references. (Also cited in this PTO form 892 was U.S. Pat. No. 9,532,104, identified in an IDS previously filed in the present application).

(Continued)

*Primary Examiner* — Andrew L Tank (57) ABSTRACT

An improved social networking system enhances text messages in a social networking system with audio content by connecting a social networking session to nearby audio speakers and routing audio messages from the session to the connected speakers in near real-time response to members' transmissions of audio messages. The system includes, for each member, a User Interface Module that provides the member with the ability to connect the social networking session to a nearby speaker. It also allows the user to rapidly select an audio clip from a personalized menu of prerecorded audio clips, and to cause all audio speakers connected to the session to timely play the selected audio clip. The menu of audio clips is chosen to include a variety of sound recordings from a wide range of sources that members will consider amusing or pertinent to recent events, such as pre-recorded "trash-talk" clips, famous movie clips, TV clips, music clips, and radio clips.

28 Claims, 5 Drawing Sheets

Related U.S. Application Data continuation-in-part of application No. 15/594,330, filed on May 12, 2017, now Pat. No. 10,063,929, which is a continuation-in-part of application No. 15/411,313, filed on Jan. 20, 2017, now abandoned.

(60) Provisional application No. 62/382,763, filed on Sep. 1, 2016.

(58) Field of Classification Search
CPC ..... H04N 21/2187; H01L 51/32; H01L 51/08; G06F 16/639; G06F 3/165; G06F 3/16; G06F 3/0482
See application file for complete search history.

(56) References Cited

U.S. PATENT DOCUMENTS

| | | |
|---|---|---|
| 6,963,839 B1 | 11/2005 | Ostermann et al. |
| 7,277,445 B2 | 10/2007 | Bartfeld et al. |
| 7,346,919 B2 | 3/2008 | Bartfeld |
| 7,571,458 B1 | 8/2009 | Eyal |
| 7,647,617 B2 | 1/2010 | Bartfeld et al. |
| 8,095,120 B1 | 1/2012 | Blair et al. |
| D666,629 S | 9/2012 | Lee et al. |
| 8,448,206 B2 | 5/2013 | Roberts et al. |
| 8,458,256 B2 | 6/2013 | Polis et al. |
| 8,482,671 B1 | 7/2013 | Chen |
| 8,561,118 B2 | 10/2013 | Flynn-Ripley et al. |
| 8,566,876 B2 | 10/2013 | Morris et al. |
| 8,584,031 B2 | 11/2013 | Moore et al. |
| 8,613,026 B2 | 12/2013 | Malhotra et al. |
| 8,630,283 B1 | 1/2014 | Breau et al. |
| 8,683,501 B2 | 3/2014 | Huegel |
| 8,694,031 B2 | 4/2014 | Lew et al. |
| 8,819,726 B2 | 8/2014 | Wetzer et al. |
| 8,840,474 B1 | 9/2014 | Dasan et al. |
| 8,850,466 B2 | 9/2014 | Beskrovny |
| 8,863,185 B2 | 10/2014 | Stinsom, III et al. |
| 8,863,198 B2 | 10/2014 | Sirpal et al. |
| 8,896,765 B1 | 11/2014 | White et al. |
| 8,918,085 B2 | 12/2014 | Lew et al. |
| 8,930,992 B2 | 1/2015 | Sugiyama et al. |
| 8,935,349 B2 | 1/2015 | Kennedy |
| 8,966,525 B2 | 2/2015 | Mehta et al. |
| 8,996,639 B1 | 3/2015 | Faaborg et al. |
| 9,043,841 B2 | 5/2015 | Kuo et al. |
| 9,063,652 B2 | 6/2015 | Cheon et al. |
| 9,098,163 B2 | 8/2015 | Kuo et al. |
| 9,143,861 B2 | 9/2015 | Schul |
| 9,170,707 B1 | 10/2015 | Laska et al. |
| 9,213,941 B2 | 12/2015 | Peterson |
| 9,247,401 B2 | 1/2016 | Lauder |
| 9,271,129 B2 | 2/2016 | Lew et al. |
| 9,307,288 B2 | 4/2016 | Rouady et al. |
| 9,357,242 B2 | 5/2016 | Sinha et al. |
| 9,369,670 B2 | 6/2016 | Clavel et al. |
| 9,377,876 B2 | 6/2016 | Ramagen et al. |
| 9,390,724 B2 | 7/2016 | List |
| 9,438,960 B2 | 9/2016 | Morris et al. |
| 9,467,968 B2 | 10/2016 | Ickovic |
| 9,509,954 B2 | 11/2016 | Huysegems et al. |
| 9,532,104 B2 | 12/2016 | Im et al. |
| 9,566,494 B2 | 2/2017 | Huston et al. |
| 9,628,296 B2 | 4/2017 | Libin et al. |
| 9,665,567 B2 | 5/2017 | Liu et al. |
| 9,996,217 B2 | 6/2018 | Kozloski et al. |
| 10,157,224 B2 | 12/2018 | Kazi et al. |
| 10,536,738 B2 | 1/2020 | Garcia et al. |
| 2003/0038893 A1 | 2/2003 | Rajamaki et al. |
| 2003/0064807 A1 | 4/2003 | Walker et al. |
| 2003/0185232 A1 | 10/2003 | Moore et al. |
| 2004/0024822 A1 | 2/2004 | Werndorfer et al. |
| 2005/0076362 A1 | 4/2005 | Dukes et al. |
| 2006/0040643 A1 | 2/2006 | O'Connor |
| 2006/0112344 A1 | 5/2006 | Ducheneaut et al. |
| 2007/0220575 A1 | 9/2007 | Cooper et al. |
| 2008/0134052 A1* | 6/2008 | Davis ............... H04L 51/12 715/744 |
| 2008/0268929 A1 | 10/2008 | Billmaier et al. |
| 2009/0043856 A1 | 2/2009 | Darby |
| 2009/0063995 A1 | 3/2009 | Baron et al. |
| 2009/0143007 A1 | 6/2009 | Terlizzi |
| 2009/0191929 A1 | 7/2009 | Nicora |
| 2009/0322762 A1 | 12/2009 | Iiagan |
| 2011/0066941 A1* | 3/2011 | Chipchase ............ G06F 3/165 715/716 |
| 2011/0083085 A1 | 4/2011 | Steelberg et al. |
| 2011/0202879 A1 | 8/2011 | Stokicek |
| 2012/0036195 A1 | 2/2012 | Kennedy |
| 2012/0042007 A1 | 2/2012 | Weel |
| 2012/0148033 A1 | 6/2012 | Tibbits |
| 2012/0170903 A1 | 7/2012 | Shirron et al. |
| 2012/0185774 A1 | 7/2012 | Perlman et al. |
| 2012/0266081 A1* | 10/2012 | Kao ............... G06Q 50/01 715/751 |
| 2012/0278825 A1 | 11/2012 | Tran et al. |
| 2012/0324368 A1 | 12/2012 | Putz |
| 2013/0006627 A1 | 1/2013 | Guthery et al. |
| 2013/0145248 A1 | 6/2013 | Friedlander et al. |
| 2013/0166457 A1 | 6/2013 | Du et al. |
| 2013/0179783 A1 | 7/2013 | Woods et al. |
| 2013/0303268 A1 | 11/2013 | Miller |
| 2013/0316746 A1 | 11/2013 | Miller |
| 2014/0067969 A1* | 3/2014 | Archibong ....... H04N 21/44218 709/206 |
| 2014/0188997 A1 | 7/2014 | Schneiderman et al. |
| 2014/0189608 A1 | 7/2014 | Shuttleworth et al. |
| 2014/0214986 A1 | 7/2014 | Hwang et al. |
| 2015/0256895 A1 | 9/2015 | Young et al. |
| 2016/0164811 A1 | 6/2016 | Guthery et al. |
| 2016/0164927 A1 | 6/2016 | Naik |
| 2016/0197969 A1 | 7/2016 | Bai et al. |
| 2016/0232201 A1 | 8/2016 | Goran et al. |
| 2016/0246469 A1 | 8/2016 | Eidelson |
| 2017/0013579 A1 | 1/2017 | Stacey et al. |
| 2017/0026796 A1 | 1/2017 | Pai et al. |
| 2017/0034088 A1 | 2/2017 | Guthery et al. |
| 2018/0103000 A1 | 4/2018 | Guthery et al. |
| 2018/0262452 A1 | 9/2018 | Guthery et al. |

OTHER PUBLICATIONS

Rachel Gawley et al., "SoundBoom: Breaking App Barriers," MobiCASE2011, LNICST 95, pp. 345-348, (2012).
Author Unknown, "How to Use Facebook Messenger," www.wikihow.com/Use-Facebook-Messenger, Jun. 22, 2016 (as recorded by: www.archive.org).
Lassonde Staff, "BLERP: APP for Sharing Your Favorite Soundbites," http//lassonde.utah.edu/blerp, Jun. 9, 2017.
https://itunes.apple.com/us/app/melomoji-with-audioisms/id1192437335?mt=8; App Store Preview, "MeloMoji with Audioisms," copyright notice—2018, purported App "release date" Jan. 12, 2017.
https://itunes.apple.com/us/app/melomoji-with-audioisms/id1192437335?mt=8 App Store Preview, "MeloMoji with Audioisms," with version history, purported App "release date" Jan. 12, 2017.
https://appadvice.com/app/melomoji-with-audioisms/1192437335 AppAdvice, "Introducing the MeloMoji with Audioisms App by Carmelo Anthony," copyright notice—2019, purported App "release date" Jan. 12, 2017.
www.melomoji.com, copyright notice 2017 WhatsGoodApps LLC.
Francesco Ricci et. al., "Introduction to Recommender Systems Handbook", Springer Science, pp. 1-35 (2011).
Broussard, "YouTube iOS App Updated With iMessage Support for Easily Sharing Videos," (Oct. 3, 2017). https://www.macrumors.com/2017/10/03/youtube-ios-app-updated-imessage/.
Zibreg, "Three ways to share YouTube videos through iMessage." (Oct. 3, 2017). https://www.idownloadblog.com/2017/10/03/how-to-share-youtube-videos-imessage-app/.

(56) References Cited

OTHER PUBLICATIONS

Padhiyar, How to Share YouTube Videos Using iMessage App on iPhone and iPad. (Oct. 4, 2017). https://www.igeeksblog.com/how-to-share-youtube-videos-using-imessage-on-iphone-ipad/.
https://www.youtube.com/watch?v=GPjp84cjEXM (URI for YouTube video of Fred Flinstone, Jan. 2, 2020; see attached image of corresponding YouTube thumbnail from an iMessage sent Mar. 30, 2020).
https://www.youtube.com/watch?v=3ishbTwXf1g (URI for YouTube video from movie "Sudden Impact," Jul. 4, 2011; see attached image of corresponding YouTube thumbnail from an iMessage sent Mar. 30, 2020).
Author unknown, "Long Distance Movie Night," copyright notice—2014 Gaze.
Author unknown, "What is myCircle.tv," copyright notice 2018 myCircle.TV.

\* cited by examiner

METHOD FOR ENHANCING TEXT MESSAGES WITH PRE-RECORDED AUDIO CLIPS

This application claims priority under 35 U.S.C § 120 to application Ser. No. 15/678,525 filed on Aug. 16, 2017; application Ser. No. 15/549,330 filed on May 12, 2017; and application Ser. No. 15/411,313 filed on Jan. 20, 2017; each of which further claims priority under 35 U.S.C § 119(e)(1) to a related provisional application Ser. No. 62/382,763 filed on Sep. 1, 2016.

BACKGROUND OF THE INVENTION

Embodiments of the invention relate generally to an improved social networking system. Conventional social networking systems allow a group of friends to share text messages, images (e.g., emojis and GIFs) and related attachments via their smartphones, computers or other personal user interface devices (PIDs). Each member of a social networking session enters text messages and selects associated images/attachments on their PIDs. One example of an attachment is a voice clip recorded on the PID. The PID broadcasts the messages and related content to one or more members of the session.

Each member's PID displays the received visual messages in a log that is arranged in chronological order, along with icons representative of the attachments. Each member views the log on their own PID, and can click on a selected audible attachment (such as a voice clip recorded by another member) to prompt the PID to play the attachment on the PID's integrated speaker or on an external speaker if the PID was previously connected to an external speaker.

SUMMARY OF THE INVENTION

Embodiments of the invention relate generally to a social network messaging system that allows each user to enhance the user's messages with audio clips selected from a personalized menu of recordings, and to share the selected clips with one or more friends for automatic play through audio speakers in rooms where the friends currently reside, without requiring the friends to select each audio clip and request that it be played. In one embodiment, the system includes, for each user, a handheld User Interface Module (such as a smart phone or pad computer) with a personal display such as in PIDs used in conventional social networking systems. The User Interface Module includes a means for receiving the user's request to connect a social networking session to a selected local audio speaker, such as a speaker embedded in the User Interface Module and/or a nearby external speaker (for example, a wireless room speaker). Upon receiving the user's request, the system is configured so that each incoming audio clip sent by any other member of the social networking session is automatically played through the selected local speaker. While the clip plays on the local speaker, the User Interface Module preferably identifies the member who sent the audio clip.

In one embodiment, each User Interface Module presents its user with a personalized menu of short, pre-recorded audio clips from a wide range of sources. The duration of each clip is preferably limited to a maximum length of about 5-10 seconds, a single sentence or a small number of sentences. Each clip preferably expresses a single thought or concept that users might want to convey in their messages. This allows the user to communicate a thought in an amusing way by sending a well-known clip rather than typing or dictating the thought in their own words. For example, the database includes iconic catchphrases or sentences that express thoughts that user's might enjoy weaving into their conversations, such as "You can handle the truth!;" "ehhh, what's up doc?;" "What we've got here is failure to communicate;" and "Make my day." The clips can also include recordings of personal catchphrases commonly used by members of a friend group. Many friends have their own, personal catchphrases that they use in conversation. Members can record these catchphrases and store them in a clip database for later use in the clip menu, so they can be quickly retrieved and sent to one of more friends during a social networking session.

Each personalized menu is automatically populated with recordings that are selected based, at least in part, upon predetermined preferences of a corresponding user. Each audio clip entry is labeled with corresponding clip-descriptor to aid the user in quickly choosing and launching a pertinent audio clip. Preferably the menu dynamically adjusts in response to changed circumstances to offer the user new choices of pertinent or amusing clips, such as previously recorded "canned" comments on selected topics, well-known catchphrases (such as famous lines from movies and television shows), and pertinent recordings from members of the group during past sessions. This system helps the user to quickly find and send entertaining clips to friends in real-time response to recent circumstances, and automatically plays the clips on speakers where members of the session currently reside. This audio clip menu is complemented with other sources of audio input, such as a text-to-audio engine and a VoIP chat feature.

The system also includes an arbitration service for preventing clips from overlapping in time (conflict), and/or for resolving such conflicts if they occur.

DETAILED DESCRIPTION OF AN EMBODIMENT

A. System Overview

Figure 1:
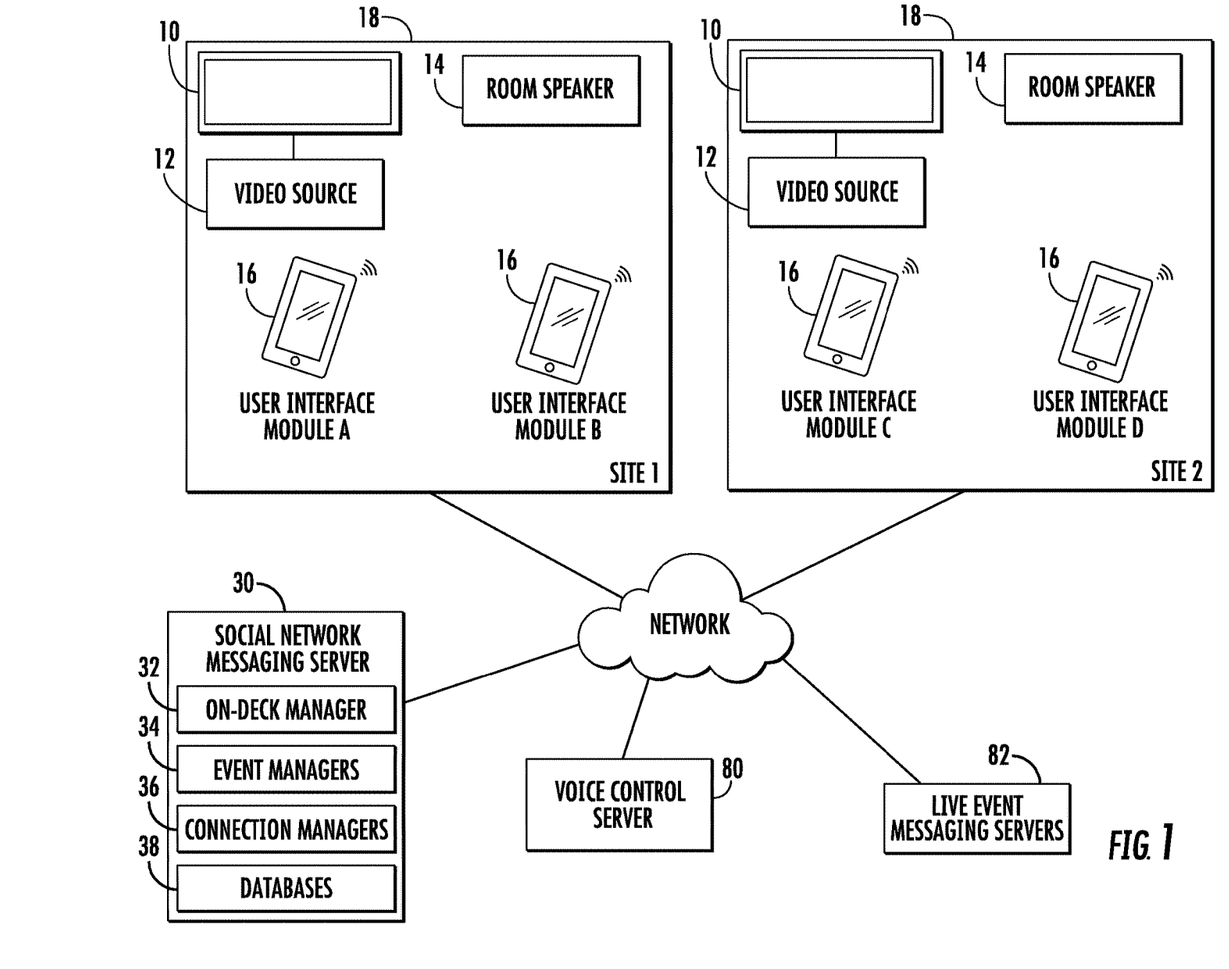
FIG. 1 is a block diagram showing an embodiment of a social networking system.

FIG. 1 depicts a social networking system that includes a local entertainment system 18 at each of a plurality of sites. Preferably, each local system 18 includes a display 10 (such as a television or monitor) that is coupled to a video source 12 that provides the display 10 with a video of a live performance (such as a football game) or other broadcast/multicast video. Video sources include, for example, interactive TV systems having modems/servers for delivering real-time, multicast video streams, such as cable TV systems/modems, Internet streaming systems and satellite TV.

The local system 18 also includes an audio speaker 14. The audio speaker 14 can be integral to the display 10, as in known televisions, or a separate standalone speaker as shown. Preferably, speaker 14 has an output capacity that is powerful enough to generate quality audio at a volume that can be clearly heard throughout a room where the speaker resides ("Room Speaker").

Room Speakers preferably include wireless communication capabilities, such as WI-FI and/or Bluetooth, having sufficient bandwidth to receive wireless transmission of audio content and to play the audio content in near real-time response to a user's selection of audio as explained below.

In one embodiment, Room Speakers 14 are implemented with a commercially available voice-controlled speaker, such as an "Echo" speaker by Amazon Inc., a Google "Home" speaker or similar hi-fidelity wireless audio speaker. Such implementations of Room Speakers 14 have a built-in microphone and an Internet connection to a Voice Control Server 80. Room Speakers 14 can also be implemented with other types of wireless speakers, such as simpler types of Bluetooth enabled speakers which lack Wi-Fi-Internet connectivity.

Users at each site interact with their respective User Interface Modules 16 to create a social networking session with one or more friends as is known in the art. As with conventional social networking systems, the User Interface Modules allow users to share text messages with each other. However, during a social networking session, the User Interface Module 16 also includes one or more UI elements (e.g., screen views or buttons) that allow a member to couple the social networking session to a local speaker (such as a nearby Room Speaker, a built-in speaker within the User Interface Module or a headset speaker), and to rapidly select pertinent audio clips for real-time play on all speakers coupled to the social networking session. For example, one display element includes a button that allows the user to select a nearby speaker and configure the system to connect the selected speaker to the social networking session. Another screen view includes a personalized menu of amusing, pre-recorded audio clips, wherein the menu is filled with brief audio clips that are pertinent to recent events and to recent exchanges between members of the social networking session. In response to the user's choice of an audio clip from the menu, the User Interface Module emits a request to route the selected clip in near real-time to each member of the session, and to automatically play the clip on each speaker that is connected to the session.

The system includes a Social Network Messaging Server 30 for routing text and audio messages between members of a social networking session. Server 30 includes one or more databases 38 that store audio clips, meta-data for the clips, friend lists (with contact information and preferences), and voice profiles for users. It also includes On-Deck Managers 32 and Event Managers 34 for managing menus of audio clips that are presented on User Interface Modules 16. Server 30 also includes Connection Managers 36 for establishing and managing connections with User Interface Modules, Room Speakers 14, and other network servers as needed to support the live, audio-clip sharing functions described here.

The system also includes Event Messaging Servers 82, such as sporting event feeds, news feeds or other services that stream notifications of events to Server 30 or to User Interface Modules for use in controlling the menu content.

B. User Interface and User Operation

Figure 2:
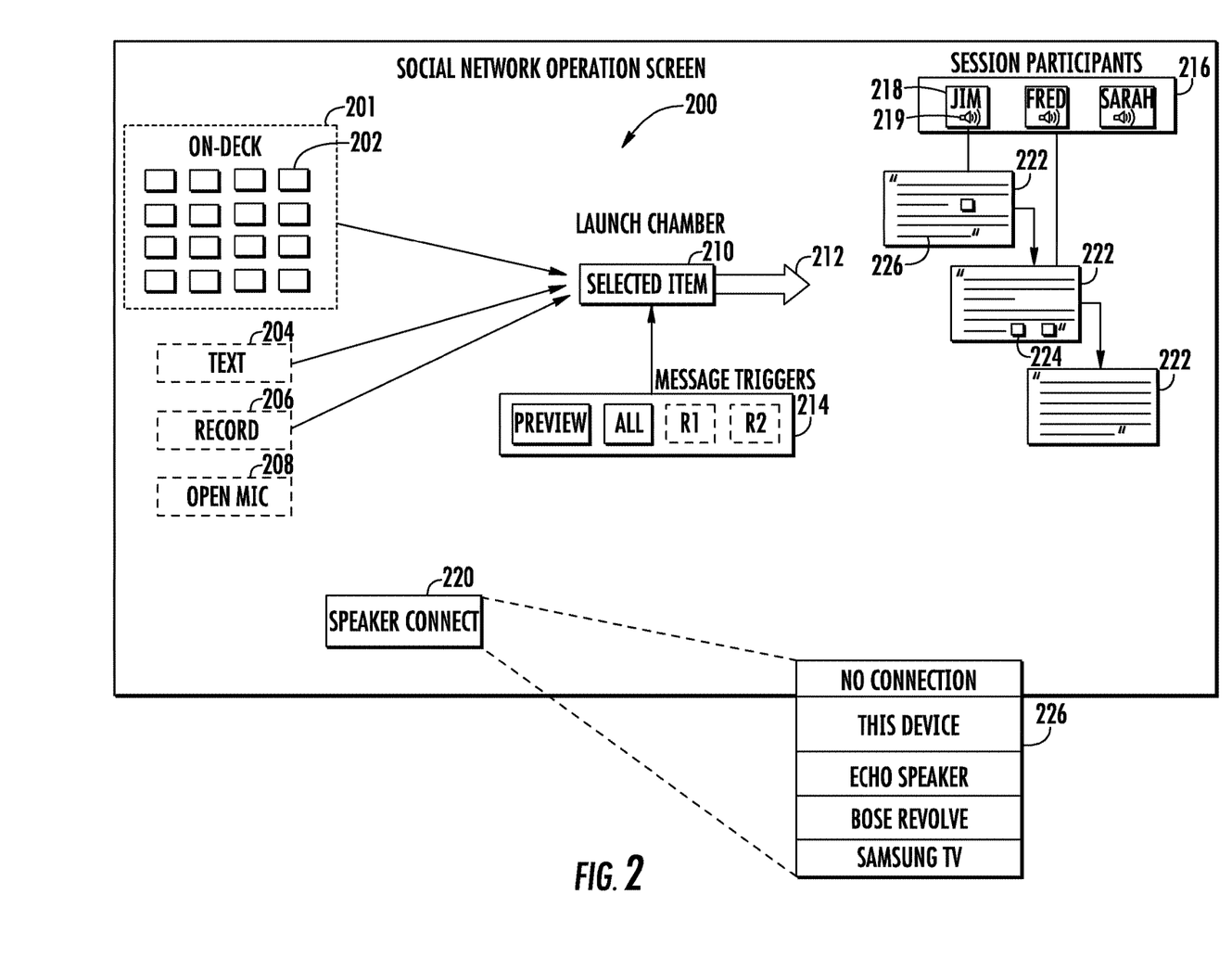
FIG. 2 shows an embodiment of a user interface ("UI") screen of a User Interface Module for use in coupling a social networking session to a local speaker and sending audio clips to one or more members of a social networking session for play on connected speakers.

FIG. 2 depicts a display screen 200 of a User Interface Module for allowing the user to interact with friends in a social networking session. UI screen 200 includes a "Connection Prompt" 220 for inviting the user to connect the social networking session to a local speaker so that incoming audio messages from the session are automatically routed to the speaker. In one embodiment, Connection Prompt 220 is a button for allowing the user to connect a session to a selected speaker.

When the user touches button 220, the User Interface Module turns on the module's Bluetooth component (if not yet active) and performs a Bluetooth scan for nearby Bluetooth devices. (In an alternative embodiment, the User Interface Module includes a Bluetooth search module running in the background during a social networking session. The search module occasionally scans the area for nearby Room Speakers during the social networking session). The User Interface Module examines the service IDs of all responding devices to determine if any nearby Room Speakers 14 can support a connection to the social network session. The user interface module presents a menu 226 of speakers from which the user can select, including the integrated speaker within the User Interface Module ("This Device") and all available external speakers. If the user selects a speaker from the menu, the system is configured to automatically route incoming audio clips from the social network session to the speaker for automatic play upon arrival. The User Interface Module then updates the text of button 220 to read "Connected to Speaker X," wherein X includes the user-friendly name of the selected speaker. Preferably, the User Interface Module also sends a notification to all members of the social networking session announcing that the user has connected to a speaker, thereby informing them that their audio submissions will automatically be played in real-time. (In the embodiment shown, menu 226 includes a disconnect option for terminating an existing connection).

The session participants are shown in a roster pane 216. The example shown includes three participants, but sessions can include two or more participants. For each participant in the social networking session, pane 216 includes an identifier 218 with an avatar and/or a name of the participant. In one embodiment, each identifier 218 includes a toggle button 219 that allows the user to connect or disconnect individual members from the above described speaker connection. In another embodiment, each button 219 operates in a manner similar to the main connection prompt 220, thereby allowing the user to select a particular speaker for each session participant. For example, the user could connect user Jim to a nearby Bose Revolve speaker and user Sarah to a nearby Echo speaker, while disconnecting Fred's audio input so that Fred's audio input arrives as a mere attachment without being automatically played upon arrival.

The screen 200 includes several panes 201, 204, 206 and 208 with which the user crafts messages for distribution to members of the social networking session. Pane 204 accepts a user's typed messages as in a conventional social networking system. In one embodiment, the user is prompted to select whether the text message should be routed to a speech synthesis module for automatically converting the text message into an audio clip. One skilled in the art will recognize that the speech synthesis module can reside at various locations in the system, as long as the speech is ultimately available in audio format for play on the connected speakers. If the user does not request conversion, the text message remains in text format and is distributed to participants in the social networking session for display as in a conventional social networking application.

Pane 201 contains a scrolling list of audio clips available for selection by the user, wherein the menu of clips is tailored to the user's preferences (the "On-Deck" clips). The content and arrangement of the On-Deck Menu 201 are preferably controlled by On-Deck Manager 70 (within the User Interface Module, FIG. 3) in collaboration with an On-Deck Manager 32 of Server 30 (FIG. 1).

Each entry 202 in On-Deck pane 201 is a virtual button that displays an indication of the type of sound in the clip and the clip's duration. For example, a clip authored by a famous comedian would be identified by descriptive text and/or an icon that provide the user with sufficient information to quickly recognize the clip's author and the content of the sound clip. When the user moves the cursor over the button, a small window opens with more information on the content of the clip. In one embodiment, User Interface Module plays a preview of the clip to assist the user in selecting a clip. This allows the user to rapidly find in the menu an interesting clip that is responsive to recent events, to commentary in the social networking session, or to clips that recently played through local speaker.

When the user selects the button 202 of a desired sound clip, the User Interface Module loads the clip's identifier into a "Launch Chamber" pane 210. This clip identifier provides sufficient information for the user to recognize the chambered clip and to confirm the selection. The user can drag multiple items from menu 201 into the Launch Chamber, effectively teeing up a succession of clips. However, the combined duration of the clips cannot exceed a predetermined limit (e.g., approximately 5-10 seconds) set by an arbitration service described below.

Pane 206 is a "voice record" button that, when pressed, creates a UI fragment or window that prompts the user to speak into a microphone in the User Interface Module 16 to record a custom audio clip (or into a microphone of Room Speaker 14). Preferably, the recording is also automatically limited to a short duration of approximately 5-10 seconds. Long clips are less desirable in this embodiment of the system since they occupy the speaker for too much time and thus dominate the conversation.

Pane 208 is an "Open Mic" button that instructs the system to establish a temporary voice channel (or to open an existing voice channel) with the Room Speakers of each session member. For example, the voice channels can be implemented using the Voice Over IP manager ("VOIP") Manager" 64 of the User Interface Module in collaboration with the Connection Managers 36 of server 30.

A Trigger Pane 214 contains one or more trigger buttons for launching the chambered items, and a "Preview" button for listening to the chambered audio items on a local Room Speaker and/or on a personal speaker, such as an earpiece for playing a clip at a relatively low volume and at an accelerated pace to allow the local user to "preview" the clip before launching.

The "All" button instructs the system to send the chambered items to all session members. To confirm that the launch occurred, a Launch Indicator 212 is briefly displayed (e.g., with a "Toast" object in Android based systems), and/or an entry is added to a message log 222. A message log 222 is located beneath the roster pane 216. This log displays a scrolling list of recent messages (e.g., text messages 226 and audio clip icons 224). The log is preferably arranged in columns as shown, with each column containing messages sent/received by the participant whose identity appears at the top of the column as shown. Each row represents the relative order in which the messages were shared.

In some embodiments, the Trigger Pane 214 contains additional trigger buttons for sending the chambered items to only certain members of the session, such as a reply message intended only for the author of the most recently received message. For example, when an audio message arrives at site 1 from a remote user "R" and is played through the local speaker, the Trigger Pane 214 in each local User Interface Module 16 adds a Reply Button R1. When the Reply Button R1 is touched (or otherwise actuated), it causes the system to launch the chambered item to only user R and to briefly display a corresponding Launch Indicator 212 that confirms the launch. (In one embodiment, all launched audio clips are also played on any connected local speaker). Similar Reply Buttons R2 can be added for other recently played items to allow local users to reply to other recent commentary without broadcasting their responses to all members of the session.

The Reply Buttons appear in the order in which their corresponding incoming messages arrived. The Reply Buttons are preferably limited to only relatively recent messages, such as the three most recently received comments, or comments made within the last minute or so. Each Reply Button preferably includes an indicator that identifies the author of the incoming message (i.e., the reply target) and of the nature of the incoming message (e.g., the clip identifier or descriptive text).

The All Button and Reply Buttons are simultaneously displayed to allow the user to quickly choose between the available distribution options for the chambered clip, but each Reply Button disappears once it is used.

C. User Interface Module

Figure 3:
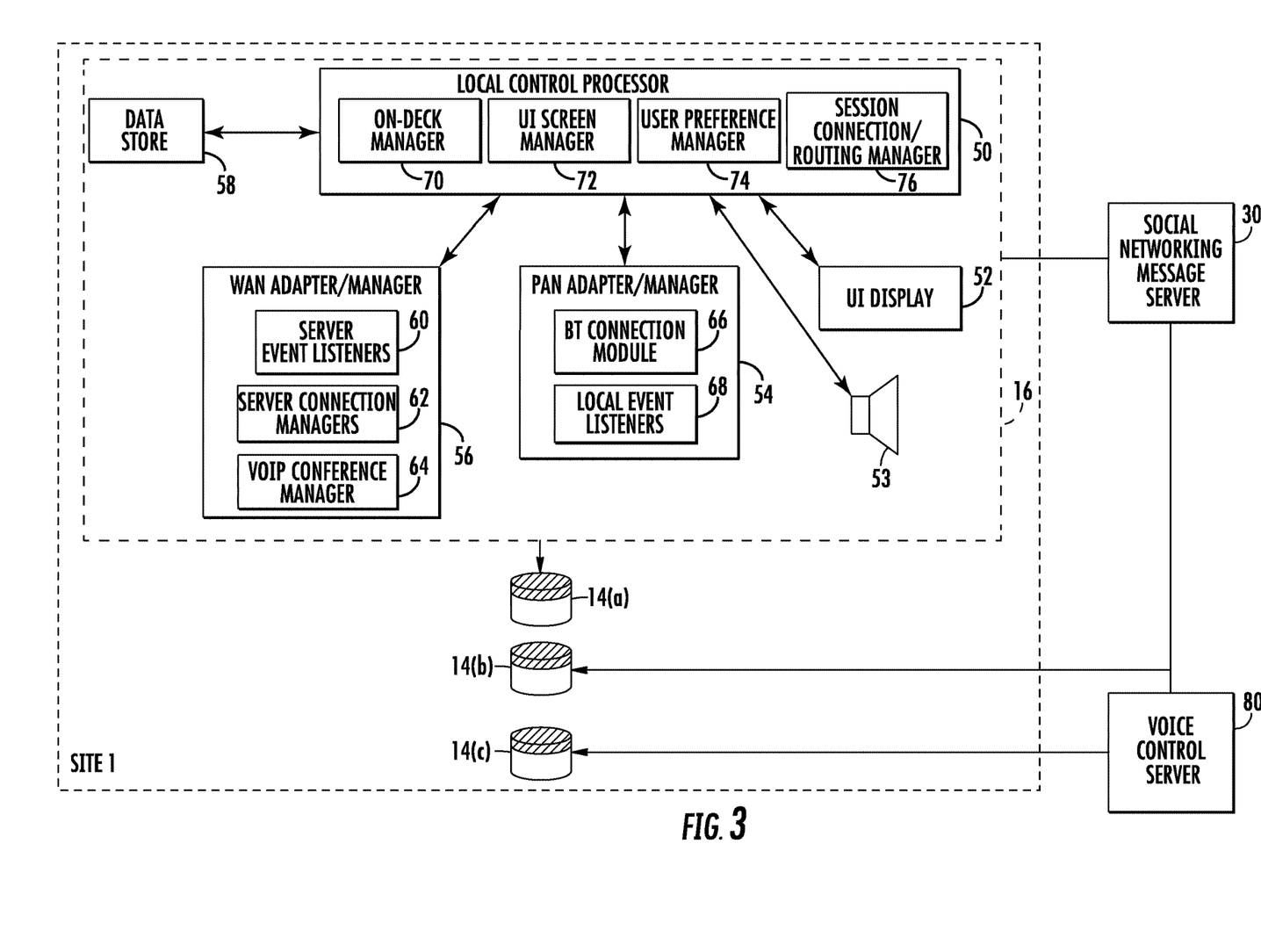
FIG. 3 includes a block diagram of a User Interface Module, and shows alternative routes for connecting a speaker to a social networking session.

Referring to FIG. 3, User Interface Module 16 includes a touch screen UI Display 52 for interacting with a local user, and an integrated audio speaker 53. It also includes a personal area network (PAN) Manager 54 for short-range communication with nearby devices, such as Room Speakers 14, video source 12, and display 10. The PAN manager includes a Bluetooth connection module 66 for establishing Bluetooth connections with the nearby devices. It also includes "Local Event Listeners" 68 for monitoring and reacting to various local events, such as a change of the video channel of a local video source at the site and the arrival/departure of other local User Interface Modules to/from the site.

A wide area network (WAN) manager 56 preferably manages the User Interface Module's communications with an Internet router/gateway at the site and is customized with functionality for implementing system features, such as Server Event Listeners 60, Server Connection Managers 62, and VoIP Conference Manager 64. The Server Connection Manager preferably includes one or more modules for establishing connections with or otherwise communicating with the server 30 and servers 80, 82.

The User Interface Module includes data store 58, and a local control processor 50 that manages several operations, and includes an On-Deck Manager 70, a UI Screen Manager 72, a User Preference Manager 74, and a Session Connection/Routing Module 76. These modules interact with server 30 to implement the operations described here.

Data store 58 is a non-volatile memory, such as flash memory, that stores software and data required for implementing the functions of the User Interface Module, and can include a cache of selected audio clips and sufficient information to populate the menu with indicia for each clip. It can also include information that identifies the clips stored on server 30, or can include a local database of audio clips similar to database 38 on server 30.

D. Speaker-to-Session Connections

Referring to FIG. 3, the system can connect a user's social networking session to a nearby speaker via several different channels. For example, if the user selects the integrated speaker 53 within the User Interface Module, the connection manager 76 is configured to route incoming audio clips from the social networking session directly to the integrated speaker for play upon arrival.

If the user selects a Room Speaker 14(a) with Bluetooth capability, the Session Connection Module 76 is configured to automatically route incoming audio messages from the social networking session to speaker 14(a) via a Bluetooth link.

Speaker 14(b) is an Internet enabled speaker having, for example, a Wi-Fi module for coupling to the Internet. To couple the user's social networking session to speaker 14(b) via the Wi-Fi channel, the Session Connection Module 76 instructs Social Networking Message Server 30 to establish a connection that routes incoming audio clips from the session directly to the speaker 14(b) via the Internet.

Speaker 14(c) is an Internet enabled speaker that is controlled by a corresponding Voice Control Server 80, such as an Echo speaker that is controlled by Amazon's voice command servers 80, or Google's Home speakers that are controlled by Google servers. To couple the user's social networking session to speaker 14(c) via servers 80, Social Networking Message Server 30 is configured to route incoming audio clips from the session to the speaker's control server 80 and instructs the server 80 to forward the clip for play on speaker 14(c).

Regardless of the chosen route for coupling each local speaker to a social networking session, the system allows remote members to share audio commentary in near real-time for automatic play on all corresponding speakers that are coupled to the social networking session.

E. Building and Maintaining Audio Clip Databases.

Figure 4:
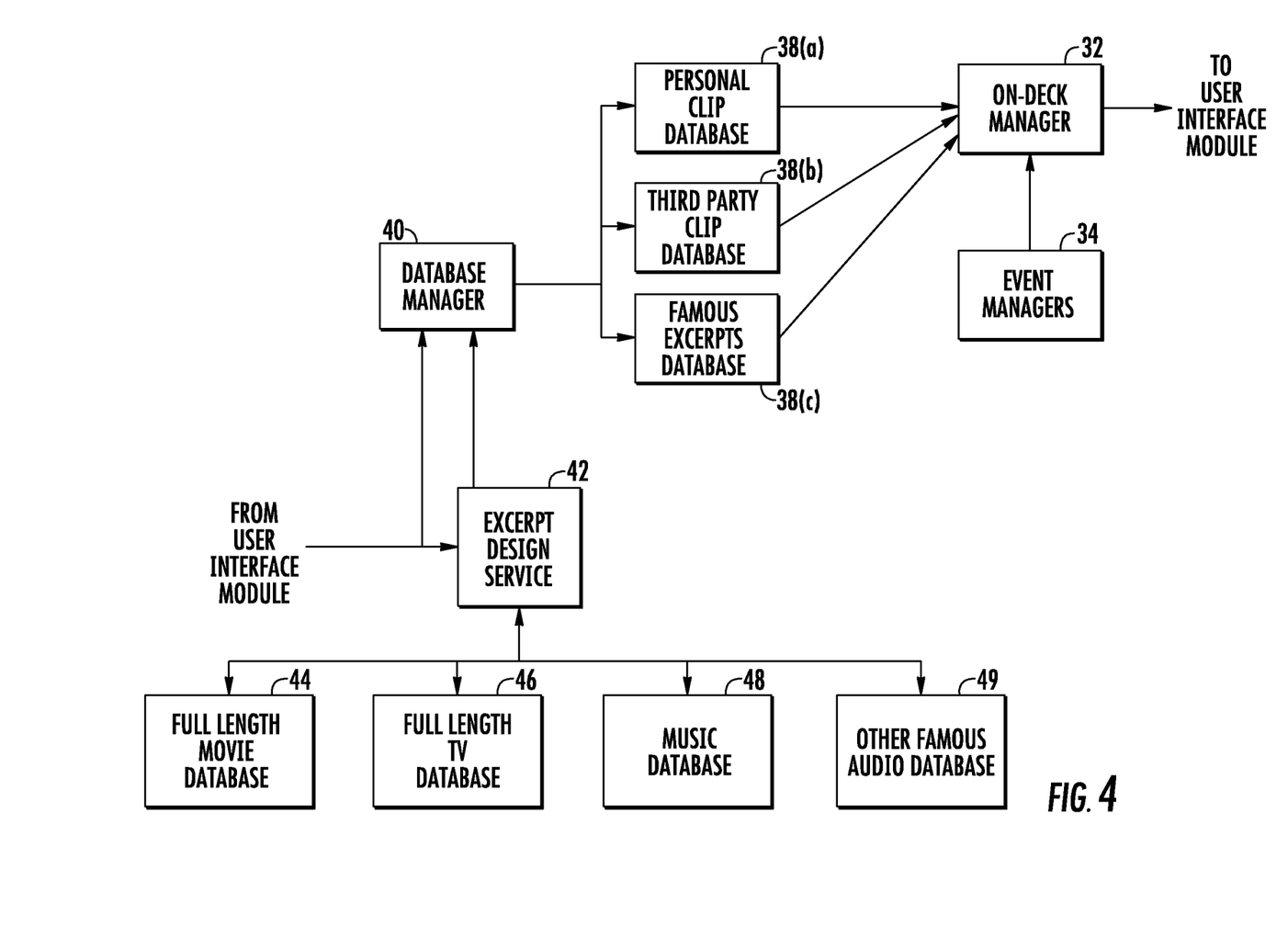
FIG. 4 is a diagram of a system for managing audio clip databases.

The audio clip databases 38 preferably include clips that are tagged or indexed with a variety of parameters, such as the name of the author, the subject of the clip's content (e.g., a text transcript for spoken clips), and other metadata useful to the On-Deck Managers in choosing clips that are relevant to a given Session Context, including data indicative each user's prior selection of clips during a previous Session Context. User Interface Modules 16 and server 30 allow the user to add new clips to the databases.

FIG. 4 depicts the structure and operation of a process implemented by server 30 for storing and managing audio clips. A personal clip database 38(a) contains clips previously recorded by a user for personal use. Each user can pre-record "canned" audio clips with a User Interface Module 16 for storage in the database in anticipation of upcoming events. Such recordings can include pre-scripted commentary, catchphrases or sound effects recorded with the user's User Interface Module and submitted to server 30 for inclusion in the database, such as the fun banter or "trash talk" that athletes and fans sometimes exchange during friendly competition. They can also include clips created by the user during a social networking session using buttons 204, 206 (FIG. 2), along with metadata representing the circumstances at the time of the recording or user specified metadata for characterizing the topic of the recording and its relevance. The user can configure the User Interface Module to instruct server 30 to include such clips in personal database 38(a) for future use by the On-Deck Managers when populating that user's personal on-deck menu.

A third-party clip database 38(b) contains licensed, pre-recorded clips from third parties, such as well-known comedians, celebrities, or others: Server 30 provides a service that allows registered members to submit pre-recorded clips to the licensed clip database 38(b) for use by On-Deck Managers when preparing On-Deck Menus for other users. User Interface Modules and server 30 provide a mechanism for authors of such clips to grant permission for adding the clips to the database for subsequent use in menus 201. The system can track the usage of clips in database 38(b) and pay royalties to authors based upon the volume of use. In another embodiment, the system offers clip bundles containing a plurality of clips that users can purchase or rent for a fixed fee.

A famous excerpts database 38(c) contains licensed audio excerpts from movies, television shows, radio shows, songs and other famous media content having an audio component. Server 30 populates and maintains this database with licensed clips from such sources. However, server 30 also provides users with the ability to request excerpts from the original audio content for inclusion in the database. For example, the user may desire to prepare a clip that is not found in the database, or to extract a clip that is shorter or longer than one already in the database. Server 30 provides an Excerpt Design Service 42 that allows users to access databases of original licensed content. The databases include the full audio track of entire movies 44, TV shows 46, music 48, or other famous content 49 such as radio recordings and internet recordings (e.g., www.youtube.com and blog content). They also include a searchable text database for the audio content (such as a transcript or index of spoken audio) to assist the user in searching for relevant excerpts. Excerpt Design Service 42 interacts with the User Interface Module to assist a user in locating a particular excerpt of interest and selecting a particular time window of interest in such content for use as a clip. A Database Manager 40 interacts with the User Interface Modules and the Excerpt Design Service 42 to add new clips to the various clip databases.

The duration of each clip is preferably limited by the system to a maximum length of about 5-10 seconds, a single sentence or a small number of sentences typical of a single turn in a normal conversation. In one embodiment, the clips express a single thought or concept that users might want to include in their messages. This allows the user to convey that thought in an amusing way by sending a well-known clip rather than typing or dictating the thought in the user's own words. For example, the database includes iconic catch-phrases or sentences that express thoughts that user's might enjoy weaving into their conversations, such as "You can handle the truth!;" "ehhh, what's up doc?;" "What we've got here is failure to communicate;" or "I'm as mad as hell and I'm not going to take it anymore." The clips can also include personal recordings of catchphrases commonly used by members of a friend group. Many friend groups have their own, personal lexicon and catchphrases that they use in conversation. Members can record person statements with these catchphrases and store them in the clip database.

The clip database also includes sound effects that can be used to imply or convey a message, such as a "wrong buzzer" to indicate rejection; a cricket chirp that impliedly mocks a recent comment as boring or not humorous; or a horn sound that conveys approval or celebration of a recent message or event. Such sound effects are tagged with metadata that identifies these implied meanings to assist the On-Deck Managers in locating relevant sound effects for inclusion in menu 201.

Such brief audio clips promote rapid banter between members because they occupy the speakers for only a brief instant that is generally less than or about equal to the duration of a person's turn in a typical conversation. A simple example of some audio clips and some associated metadata for use in such databases are shown in the table below, wherein * is a score or weight for a specific trait used by the On-Deck Manager, such as sports, sarcasm, or politics. The table can include a separate column for each such trait.

| ID | Category | Title | Genre | Speaker | Key Phrase/Key Words | * |
|---|---|---|---|---|---|---|
| x01 | Movie | Few Good Men | Drama | Nicholson | "Can't Handle Truth" | 8 |
| x02 | Movie | Taxi | Drama | DeNiro | "Talkin to me" | 7 |
| x03 | Movie | Slapshot | Comedy | Martin | "We're Losin!" | 9 |
| x04 | Movie | Slapshot | Comedy | Newman | "Old Time Hockey" | 6 |
| x05 | Movie | Gladiator | Drama | Crowe | "Are You Not Entertained" | 5 |
| x06 | TV | | Cartoon | Silvester | "Sufferin Succotash" | 10 |
| x07 | TV | | Cartoon | Bugs | "What's Up Doc" | 6 |
| x08 | TV | | Cartoon | Mickey | "Hot Dog" | 0 |
| x09 | Music | Appetite for Destruction | Rock | Guns & Roses | "Welcome to the Jungle" | 2 |
| x10 | Music | Completely Well | Blues | BB King | "Thrill is Gone" | 3 |
| x11 | Comedian | | Adult Comedy | DiceClay | "Oh" | 7 |
| x12 | Celebrity | | Regional | DavidOrtiz | "Our F'in City" | 0 |
| x13 | Sound Effect | Failure | Comedy | 0 | Wrong Buzzer | 8 |
| x14 | Sound Effect | Bomb | All | 0 | Explosion | 5 |
| x15 | Sound Effect | Horn | Sport | 0 | Goal | 1 |
| x16 | Radio | | | Roosevelt | Fear Itself | 0 |
| x17 | Personal | | Sport | User0001 | Yankees, Hate | 0 |
| x18 | Personal | | Sport | User0002 | Red Sox, Hate | 0 |

Each user can create an account within user preference database and pre-configure it with the user's preferences that correlate with the database tags. The preference database also includes a list of the user's preselected favorite clips. The Preference Manager 34 allows the user to preview the database of clips and select the user's favorites. Preference Manager 34 and/or server 30 can also derive preference data from the history of each user's clip selection. For example, they can infer preferences from the genre and content of each user's previously selected clips and texts. A simple example of user preferences and user traits is shown below:

| User | Age | Sex | Loc | Profession | Sports | Music | Bands | Movies | Songs | Favorite Clips |
|---|---|---|---|---|---|---|---|---|---|---|
| U01 | 54 | M | Boston | Cab Driver | Hockey | Rock | Hendrix | ** | ** | X03; X06 X14; X18 |
| U02 | 21 | M | NY | Student | Basketball | Rap | M&M | ** | ** | X05; X13; |
| . | . | . | . | . | . | . | . | . | . | |
| U0n | 37 | F | Seattle | Attorney | None | Blues | BB King | ** | ** | X01; X09 |

The preference database facilitates automatically populating the On-Deck Menu with clips from the Audio Clip Databases: On Deck Manager 32 includes a search engine that uses the preference database, the Session Context (explained below), and other data to select audio clips from the audio clip databases.

F. On Deck Management

On-Deck Managers select the clips for each On-Deck Menu based on the personal tastes of one or more members of the current session. Users tend to be familiar with catchphrases from movies and cartoons of the era in which they grew up. Those catchphrases will be unrecognizable to those who grew up in a different generation. Each individual also has unique tastes that dictate which catchphrases are of interest to that person. The On-Deck Managers therefore consider demographic factors such as age, sex, and other personal traits of a user and of the user's audience when automatically selecting clips for use in a personalized On-Deck Menu. As stated above, the Preference Managers 74 allow users to identify their favorite clips from the database. The On-Deck Managers use this information when populating the On-Deck Menus for members of a session, so that members see their own favorites as well as those of their audience.

On-Deck Managers dynamically adjust each on-deck menu 201 during a social networking session in response to changes in circumstances. The goal is to help users quickly find relevant audio clips during a social networking session, so that users can react "on the fly" to events during the session and to incoming banter from other members of the session.

Parameters that influence dynamic adjustments to the menu include the identity of the user, the user's preferences, and the context of current circumstances ("Session Context"). The Session Context includes parameters and circumstances that could influence the user's choice of an interesting audio clip. For example, aspects of a Session Context can include: 1) the date and time of day, 2) the geographic location of participants, 3) the identity and preferences of participants in the current social networking session, 4) the content of recent exchanges between participants of the session, 5) the identity of a performance that participants are watching during the session (such as a sporting event, movie or television program), and 6) the occurrence of events in that performance.

The managers also update the menus in response to the content of recent incoming or outgoing messages. The system monitors the content of all incoming and outgoing messages during a social networking session and in response to certain key words or concepts in the message (using metadata from the clip database), update the menus 201 with pertinent clips, taking into consideration the identity of the person who issued the message, the identity of the recipients, the history of their prior clip selection, and the history of the local user's prior clip selection.

The menu 201 can also adjust in response to draft text messages as they are being entered via pane 204, or in response to search queries entered by a user. As the user drafts a message or search query, the system monitors the input and updates pane 201 with pertinent clips, such as catchphrases that are related to the apparent topic of the message or query.

The menu 201 can also adjust in response to a change in circumstances at the local site. For example, "Local Event Listeners" 68 within the User Interface Module monitor and react to various local events, such as a change of the video channel of a local video source at the site and/or the arrival and departure of other local User Interface Modules to/from the site. These events can be used by the On-Deck Manager to update the contents of the On-Deck Menu. For example, if the user switches the video source 12 to a channel carrying a football game, the system automatically adds sound clips to the On-Deck Menu 201 that relate to the teams and players in that game, and/or re-arranges the clips in the menu to make such clips more prominent. If the user has a known preference for one team or hostility towards another, the system can populate/arrange the On-Deck Menu with clips favorable to the preferred team and adverse to the other. Similarly, the user's preferences for players can be used to automatically add/arrange related sound clips to the On-Deck collection.

The menu 201 can also adjust in response to notifications from remote event messaging servers, such as Live Event Messaging Server 82 and/or event managers within server 30. The User Interface Module includes Server Event Listeners 60 for monitoring and reacting to events reported by such remote servers.

For example, Event Messaging Servers 82 can include sporting event feeds, news feeds or other services that stream notifications of events to server 30 or to User Interface Modules for use in controlling the menu content. For example, when video source 12 is tuned to a particular game, the event listeners in server 30 or User Interface Modules 16 can listen for when a team scores a goal, when a player gets ejected, or a new player enters the game. The On-Deck Managers can update the menu with clips pertinent to those events.

Event Manager 34 within server 30 can listen for messages from Live Event Messaging Servers 82 to detect the occurrence of pre-determined events of interest. Upon the occurrence of such events, server 30 sends notifications of the events to corresponding On-Deck Managers 70, prompting the local On-Deck Managers 70 to update their On-Deck Menus 201. For that purpose, server 30 can send new audio clips to each local On-Deck Manager 70 for inclusion in their On-Deck Menus.

G. Arbitration

When a user couples a local speaker to a social networking session that includes two or more other members, it is possible for the other members to pick and send audio clips at about the same time, creating a traffic jam of conflicting of incoming audio clips. The system includes an arbitration service for avoiding and/or managing such conflicts. In one embodiment, the connection manager 36 within server 30 includes an arbitration manager for arbitrating between such conflicting audio requests. In another embodiment, each connection manager 50 within the User Interface module includes an arbitration manager.

If the traffic jam is of a short duration, the arbitration managers simply distribute/play the clips in succession, after which the jam clears. However, if the jam exceeds a threshold, the arbitration manager determines which of the competing requests has a higher priority, selects that clip for play, discards competing requests, and notifies the senders that their clips were not played due to a collision.

In another embodiment, the arbitration manager uses a turn-based approach for avoiding such conflicts. For example, the arbitration manager issues a token that awards a single member with control of the connected speakers for a brief period of time, and circulates the token among members throughout the session. This approach mimics turn-taking in common conversation.

A variety of techniques can be used to notify each member of their turn, and prevent other members from sending audio clips until they possess the token. For example, the On-Deck Manager 70 within the member's User Interface Module (FIG. 3) can disable the On-Deck Menu 201 (FIG. 2) until the member possesses the token, thereby briefly preventing the member from selecting and sending an audio clip, but still allowing the member to draft and send text messages via the text pane 204.

An arbitration manager can consider a variety of inputs and algorithms for choosing between competing requests or for circulating the turn token. For example, a user's rank/priority can be based on a score from a prior competition (such as an interactive game score), and a user's rank can diminish based upon the volume of audio bandwidth consumed by that user's recent clip submissions.

H. Friend Group TV Interface

The social network system of the present invention allows each user to enhance the user's messages to friends who are actively exchanging messages ("on-line") at the same time, such as friends who are simultaneously watching a broadcast of a live televised event, but from different remote sites. The social network system of the present invention allows them to exchange their selected audio messages for play through speakers at all sites so they can perceive each other's messages without diverting their eyes from the screen.

Figure 5:
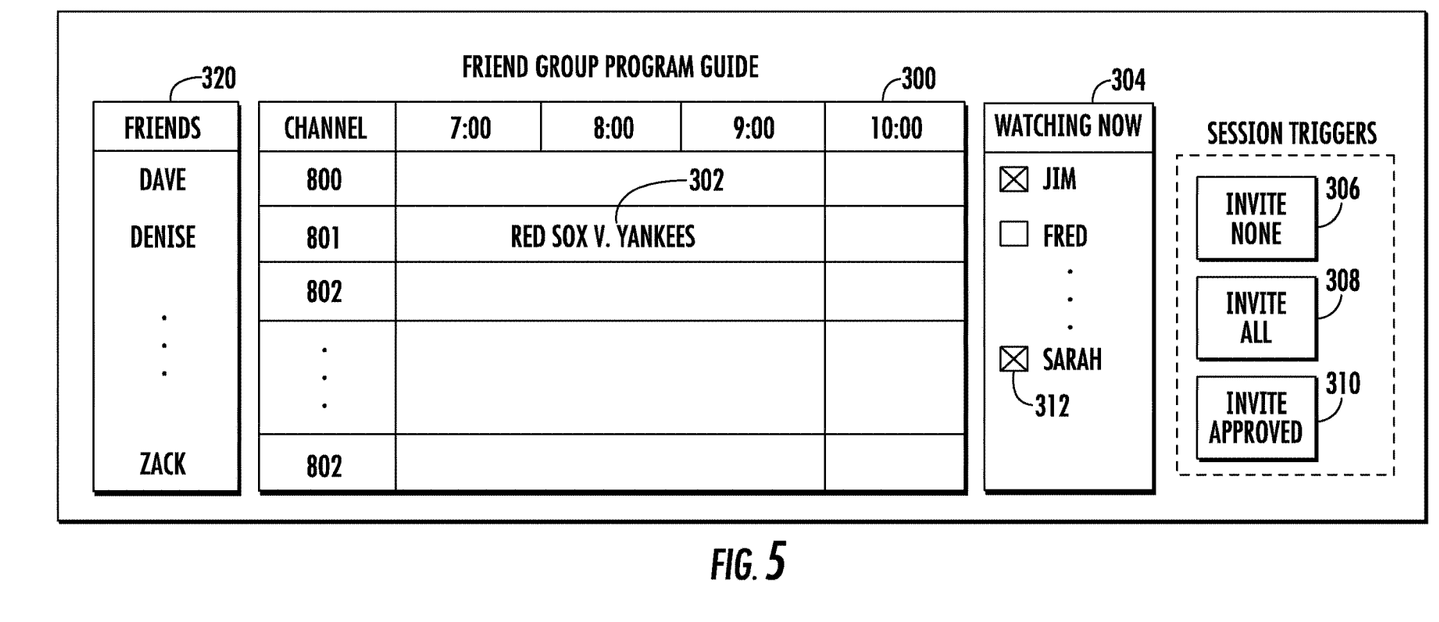
FIG. 5 shows an embodiment of a UI screen of a "Friend-Group Program Guide."

FIG. 5 depicts a "Friend Group Program Guide" for display on a site's screen 10 and/or on the User Interface Module display 52. The Friend Group Program Guide includes a program pane (or view) 300 that displays a scrolling list of available video programs.

The Friend Group Program Guide also includes a pane 320 that lists all of the Local User's friends, and highlights the names of those who are currently watching TV. If the Local User clicks on a friend's name in pane 320, a cursor in adjacent program pane 300 jumps to a cell in the program guide corresponding to the program that this friend is currently watching. This feature assists the Local User in finding a video program for which the Local User can initiate a social networking session with one or more friends.

When the cursor is placed in a particular cell of the program list 300 (e.g., cell 302 for the Red Sox v. Yankees game at 7:00 PM), the Friend Group Program Guide populates an adjacent pane 304 with a list of the user's friends who are currently tuned to that program (the "On-Channel Friends"). (In some embodiments, pane 304 also lists those who previously registered as interested in participating in social networking sessions for that program, with an indication of whether those registered friends are currently on-channel). The system obtains this information in any of a variety of ways that are within the skill of those in the art, such as communications via the Internet with Social Network Messaging Server 30 and/or peer-to-peer communications with the Friends' respective video sources and User Interface Modules.

In a server-based implementation, the local system 18 at site 1 (FIG. 1) notifies Social Network Messaging Server 30 of the site's currently selected video program and of the identity of each User Interface Module at site 1. Social Network Messaging Server 30 gathers this information from all sites and re-distributes it to each system 18 (e.g., to the local User Interface Modules or local video boxes 12) for use with that site's Friend Group Program Guide. This server-based approach can be implemented using the Extensible Messaging and Presence Protocol ("XMPP"). Again, those skilled in the art will recognize that this functionality could also be provided using a peer-to-peer implementation.

Referring again to FIG. 5, an indicator 312 next to each person's name in pane 304 shows whether that user is pre-approved by the local user for social networking sessions. If the indicator is checked, that person is pre-approved for social networking sessions for the video program shown in the cell 302 of pane 300 where the cursor is currently pointed. Each indicator 312 operates as a toggle button: The Local User can add any of the On-Channel persons to the pre-approved list or remove any from the list by toggling indicator 312 to a desired setting. The system remembers these choices in a pre-approval list such as shown in a simple example below:

| Video Program P | Pre-Approved Friends (P) |
|---|---|
| P = NE Patriots vs. NY Jets | Name 1, Name 2, . . . Name N |
| P = Pittsburgh Steelers v. Kansas City Chiefs | Name i, Name ii, . . . Name I |
| P = Talk Show "X" | Name a, Name b, . . . Name X |

Therefore, each time a user navigates to a particular cell in program guide 300, the status of indicators 312 in pane 304 are set to a state specified in a pre-approval list that is saved in data store 58 (in the local User Interface Module) and/or in database 38 of Social Network Messaging Server 30.

The Friend Group Program Guide includes a set of three buttons 306, 308, 310 for allowing the Local User to instruct the video source 12 to "tune" to a selected program and initiate a social networking session for that program.

The operation of buttons 306, 308, and 310 are summarized below:

| Button | Function |
|---|---|
| 306 | Select program but send no invitations. |
| 308 | Select program and send invitations to all friends currently watching the program. |
| 310 | Select program and send invitations only to pre-approved friends. |

The first button 306, when touched, instructs the video source 12 to "tune" to the video program pointed to by the cursor (here, cell 302 for the Red Sox v. Yankees game at 7:00 PM), but does not initiate asocial networking session. The other buttons 308, 310 are "Session Triggers" for initiating and joining social networking sessions. When the user touches button 308, the system tunes video source 12 to the selected video and also sends invitations to all friends in pane 304, asking them to join a social networking session for that program. (If a session was previously initiated with this group, the local user re-joins the on-going session). Similarly, button 310 tunes the video source to the desired channel, but sends invitations only to "pre-approved" friends (i.e., those whose indicator box 312 is checked). This allows the user to be more selective as to which On-Channel Friends to include in each social networking session.

When the user initiates a social networking session with buttons 308, 310, the User Interface Module's display 52 switches to a different UI screen 200 shown in FIG. 2. This screen 200 interacts with the user to allow the user to participate in the active session.

While the invention has been described in conjunction with the above embodiments, numerous alternatives, modifications, variations and uses will be apparent to those skilled in the art.

What is claimed is:

1. A method for enhancing text messages between a plurality of users of a social networking system, the method comprising:
   storing in one or more data storage devices a plurality of audio clips containing speech,
   storing in one or more data storage devices related metadata identifying the content of said speech,
   storing in one or more data storage devices predetermined parameters correlated to preferences of a first user of said social networking system,
   automatically selecting from said audio clips a personalized subset of audio clips for said first user, wherein said personalized subset of audio clips is automatically selected by at least one processor based at least in part on said metadata and said predetermined parameters correlated to preferences of said first user,
   displaying to said first user a personalized menu that includes said first user's personalized subset of audio clips,
   detecting a selection by said first user of an audio clip from said first user's personalized menu, and
   transmitting said first user's selection to a second user of said social networking system.

2. The method of claim 1 wherein said predetermined parameters correlated to preferences of said first user comprise data identifying at least one personal interest of said first user.

3. The method of claim 1 wherein said audio clips comprise audio clips from pre-recorded media content.

4. The method of claim 3 wherein said audio clips from pre-recorded media content include audio clips from movies or television shows.

5. The method of claim 4 wherein said predetermined parameters correlated to preferences of said first user comprise data identifying said user's age or gender.

6. The method of claim 4 wherein said predetermined parameters correlated to preferences of said first user comprise data identifying movies previously designated by said first user as a user preference.

7. The method of claim 4 wherein each of said audio clips from movies or television shows is limited to a duration of about ten seconds or less.

8. The method of claim 4 wherein said audio clips from movies or television shows comprise a plurality of single sentence audio clips, wherein each single sentence audio clip is limited to a single sentence of speech.

9. The method of claim 1 wherein said audio clips comprise personal pre-recorded audio clips of said first user.

10. The method of claim 1 wherein said audio clips containing speech and said metadata comprise audio clips and related metadata of each of the following:
    clips of speech from movies and television shows, and
    audio clips containing speech from songs.

11. The method of claim 1 further comprising the steps of:
receiving from a network server a real-time notification of an occurrence of an event, and
adjusting the subset of audio clips displayed in said first user's personalized menu based on the type of event specified in said notification.

12. The method of claim 11 wherein said receiving step comprises receiving notifications from a news feed of said network server.

13. The method of claim 11 wherein said receiving step comprises receiving notifications from a sporting event feed of said network server.

14. The method of claim 1 further comprising:
displaying to said first user a connection prompt for allowing said first user to request a connection between a selected local audio speaker at a local site, where said first user is currently located, and a chat session with at least one remote user located at a remote site, and
detecting a request by said first user via said connection prompt, and, in response,
establishing a connection between said chat session and said selected local audio speaker whereby incoming audio clips from said chat session are automatically played on said selected local audio speaker in real time response to receiving said incoming audio clips at said local site.

15. The method of claim 14 wherein said step of displaying a connection prompt comprises:
displaying to said first user a separate connection prompt for each said remote user, wherein each said connection prompt allows said first user to activate a connection between said remote user and a corresponding selected local audio speaker at said local site.

16. The method of claim 14 further comprising:
providing each remote user with an exclusive turn to send an audio clip to said selected local audio speaker, to prevent conflicting audio clips from other users during said exclusive turn.

17. The method of claim 14 wherein said first user's personalized menu is displayed on a user interface module at said local site, and wherein said selected local audio speaker is integral to said user interface module.

18. The method of claim 14 wherein first user's personalized menu is displayed on a user interface module at said local site, and wherein said selected local audio speaker is a room speaker at said local site that is external to said user interface module.

19. A method for enhancing text messages between a plurality of users of a social networking system, the method comprising:
storing in one or more data storage devices a plurality of audio clips comprising audio clips containing speech from movies and television shows,
storing in one or more data storage devices related metadata identifying the content of said speech,
storing in one or more data storage devices predetermined parameters correlated to preferences of a first user of said social networking system,
automatically selecting from said audio clips a personalized subset of audio clips of interest for said first user, wherein said personalized subset of audio clips is automatically selected by at least one processor based at least in part on said metadata and said predetermined parameters correlated to preferences of said first user,
displaying to said first user a personalized menu that includes said first user's personalized subset of audio clips,
detecting a selection by said first user of an audio clip from said first user's personalized menu, and
transmitting said first user's selection to a second user of said social networking system.

20. A method for enhancing text messages between a plurality of users of a messaging system using pre-recorded audio clips, the method comprising:
storing in one or more data storage devices a collection of pre-recorded audio clips;
storing in one or more data storage devices related metadata identifying the content of each said audio clip in said collection;
storing in one or more data storage devices predetermined parameters correlated to preferences of a first user of said social networking system;
automatically selecting from said collection of audio clips a personalized subset of audio clips for said first user, wherein said personalized subset of audio clips is automatically selected by at least one processor based at least in part on said metadata and said predetermined parameters correlated to preferences of said first user;
displaying, on a display screen of a first user interface module, a personalized menu that identifies audio clips from said first user's personalized subset of audio clips;
detecting a selection by said first user of an audio clip from said displayed personalized menu and in response:
transmitting said first user's selection to a second user interface module of a second user of said messaging system at a remote site where said second user currently resides;
inserting within a message log displayed on a display screen of said second user interface module, an icon indicative of said selected audio clip and said first user who sent it, and
automatically playing said selected audio clip on an audio speaker at said second site in real time response to said first user's selection.

21. The method of claim 20 further comprising the steps of:
displaying a connection prompt on said display screen of said second user interface module,
detecting when said connection prompt is actuated by said second user, and in response,
instructing a local control processor within said second user interface module to establish an audio clip connection between said messaging system and an external wireless room speaker at said remote site that generates audio for a room where said room speaker resides, whereby said audio clip connection automatically routs each audio clip subsequently sent by said first user via said messaging system to said connected room speaker in real-time.

22. The method of claim 21 further comprising the steps of:
sending an audio clip connection notification to said first user interface device, wherein said notification indicates that an audio clip connection is established between said messaging system and said external wireless room speaker at said remote site, and
displaying on said display screen of said first user interface module an indicator of said audio clip connection between said messaging system and said remote external room wireless speaker.

23. The method of claim 21 whereby an arbitration management processor of said messaging system is programmed to perform the step of arbitrating between conflicting selections of audio clips from a plurality of users of said messaging system for play on said connected room speaker.

24. The method of claim 23 wherein said arbitration management processor is programmed with a turn-based approach that awards a single user of said messaging system with control of the connected room speaker for a brief period of time, and sequentially circulates said control to at least one other user of said messaging system.

25. A method for messaging between a plurality of users, the method comprising:
- storing in a data store a library of pre-recorded speech clips,
- displaying to a local user a menu of at least a subset of said speech clips,
- detecting a selection by said local user of a speech clip from said local user's menu, and
- transmitting said local user's selection to a remote user of said messaging system.

26. The method of claim 25 further comprising
- automatically selecting from said library a personalized subset of speech clips for said local user, wherein said personalized subset of audio clips is automatically selected based at least in part on predetermined preferences of said local user, wherein
- said display step includes displaying in said menu said local user's personalized subset of speech clips.

27. The method of claim 26 wherein said speech clips comprise speech clips from pre-recorded media content.

28. The method of claim 26 wherein said speech clips include speech clips from movies or television shows.

* * * * *